United States Patent [19]

Allen

[11] Patent Number: 4,928,374
[45] Date of Patent: May 29, 1990

[54] METHOD OF VEHICLE SEAT LATCH
[75] Inventor: John J. Allen, Cambridge, Md.
[73] Assignee: General Motors Corporation, Detroit, Mich.
[21] Appl. No.: 342,050
[22] Filed: Apr. 24, 1989

Related U.S. Application Data

[62] Division of Ser. No. 200,339, Jun. 1, 1988, Pat. No. 4,846,526.

[51] Int. Cl.$^5$ .............................................. B23P 11/00
[52] U.S. Cl. ......................................... 29/436; 29/434
[58] Field of Search ........................ 297/378, 379, 216; 292/DIG. 22; 29/434, 436; 24/633; 188/31, 69

[56] References Cited

U.S. PATENT DOCUMENTS

| | | | |
|---|---|---|---|
| 3,628,831 | 12/1971 | Close | 297/379 |
| 3,711,056 | 1/1973 | Gmeiner et al. | 248/429 |
| 3,848,923 | 11/1974 | Dehler | 297/379 X |
| 3,972,564 | 8/1976 | Arlauskas et al. | 297/378 |
| 4,082,353 | 4/1978 | Hollowell | 297/379 |
| 4,147,386 | 4/1979 | Stolper | 297/379 X |
| 4,619,031 | 10/1986 | Loewe et al. | 29/434 |
| 4,707,010 | 11/1987 | Croft et al. | 297/378 X |

Primary Examiner—Timothy V. Eley
Assistant Examiner—Frances Chin
Attorney, Agent, or Firm—Ernest E. Helms

[57] ABSTRACT

A preferred embodiment apparatus of the present invention provides an inertial vehicle seat latch. The latch allows free pivotal movement of the seat back forwardly under low angular accelerations and restrains pivotal movement of the seat back forwardly under high angular accelerations. The latch includes a slip block pivotally mounted with respect to the vehicle along a third pivotal axis. The slip block is angularly biased against a stop generally fixed with respect to the pivotal axis of the seat back with the seat cushion. A pendulum pivotally connected on a pivot pin away from the pivotal axis of the seat back with the seat cushion. When the seat back is pivotally moved forward under low accelerations the pendulum contacts the slip block to pivot the slip block away from the second stop to allow the seat back to pivot forward. Under high (decelerations) the pendulum pivots on the second pivot pin to contact the slip block to pivot toward the second stops and thereby restrains forward movement of the seat back.

1 Claim, 2 Drawing Sheets

METHOD OF VEHICLE SEAT LATCH

This is a division of application Ser. No. 200,339 filed on June 1, 1988 now U.S. Pat. No. 4846526.

FIELD OF THE INVENTION

The field of the present invention is that of vehicle seat latches. More particularly the field of the present invention is of seat back latches for vehicle seats that pivot forward.

DISCLOSURE STATEMENT

The purpose of the seat back inertial latch is to prevent the vehicle seat back from folding forward during periods of high vehicle deceleration. An inertia or inertial latch allows the elimination of manually operable locking mechanisms in the rear of the front seats of coupes (2-door vehicles with rear row seating). Therefore, in the front seat, the seat back can rotate freely, without the need to depress a lock release lever. The present invention provides an alternative to prior inertial seat latches. The present inventive inertia latch is provided with advantageous improvements in the reduction of free play, easier emergency release lever operation, and compactness.

SUMMARY OF THE INVENTION

The vehicle seat latch includes a pendulum pivotally connected with the seat back but off center with the pivotal axis of the seat back with respect to the bottom frame portion of the seat, hereinafter referred to as the seat cushion.

A slip block is pivotally mounted along a pivotal axis fixed with respect to the seat cushion and is angularly biased against a stop.

When folding the seat back forward the seat back carries the pendulum forwards, which strikes the slip block below its pivotal axis. The above causes the slip block to rotate so that the pendulum can slide freely below it. In turn, the seat back is also allowed to continue forwardly. When the seat back is returned to its original position, a biasing spring returns the slip block to its original orientation.

When a high deceleration occurs, the pendulum rotates about its pivotal connection with the seat back. After the pendulum rotates, the pendulum will strike the slip block above the pivotal axis of the slip block. The resulting moment of the slip block, however, is opposed by the stop. The pendulum cannot move past the slip block and therefore the seat back is restrained.

It is a desire of the present invention to provide an inertial seat latch and provide a method of utilization thereof. It is another desire of the present invention to provide an inertial seat latch which is advantageous in use with recliner seats.

It is an object of the present invention to provide a seat latch for a vehicle seat with a seat cushion and a seat back pivotally mounted with respect connected to the cushion along a first pivotal axis, the latch allowing free pivotal movement of the seat back forwardly under low angular accelerations and restraining pivotal movement of the seat back forwardly under high angular accelerations, a slip block pivotally mounted with respect to the vehicle along a third pivotal axis and slip block being angularly biased against an angular second stop being generally fixed with respect to the first pivotal axis, and a pendulum pivotally connected to the seat back along a second pivotal axis whereby the pendulum contacts the slip block in a direction to pivot the slip block away from the second angular stop when the seat back is pivotally moved forward under low acceleration allowing the seat back to further pivot forward and the pendulum when exposed to a rearward acceleration of a predetermined value pivots to contact the slip block to pivot the slip block in an angular direction towards the second angular stop thereby limiting the pivotal travel of the seat back with respect to the cushion when the seat back has pivotal movement forward under a high angular acceleration.

It is another object of the present invention to provide a seat latch for a vehicle seat with a seat cushion and a seat back pivotally connected to the seat cushion along a first pivotal axis, the latch allowing free pivotal movement of the seat back forward under low angular accelerations and the latch restraining pivotal movement of the seat back forward under high angular accelerations, the latch including a first pivotal pin stop generally coaxial with the first pivotal axis, a second pivot pin generally coaxial with a second pivotal axis connected with the seat back offset rearwardly and above the first pivotal axis, a slip block pivotally connected with respect to the vehicle along a third pivot pin, the slip block having a third pivotal axis above the second pivotal axis and forward of the first pivotal axis, the slip block being angularly biased against an angular second stop generally fixed with respect to the first pivot pin stop, and a pendulum pivotally connected to the second pivot pin having a center of gravity underneath the second pivotal axis whereby the pendulum contacts the first pivot pin stop when the seat back is stationary and the pendulum contacts the slip block in a direction to pivot the slip block away from the second angular stop when the seat back is pivotally moved under low acceleration allowing the seat back to further pivot forward and the pendulum when exposed to a rearward acceleration of a predetermined value pivots on the second pivot pin to contact the slip block to pivotally urge the slip block in an angular direction toward the second angular stop thereby limiting the forward pivotal travel of the seat back when the seat back has pivotal movement forward under a high angular acceleration, and a knockout lever pivotally connected with the seat back for contacting the pendulum to slide the pendulum to a position of contact with the slip block urging the slip lock away from the second angular stop whereby the pendulum can pass below the slip block without the seat back being pivoted rearwardly.

It is another object of the present invention to provide back with a seat cushion along a first pivotal axis allowing the seat back to have free pivotal movement forward under low angular accelerations and to restrain pivotal movement of the seat back forward under high angular accelerations, the method including pivotally connecting the seat back with the seat cushion along the first pivotal axis, connecting with the seat cushion a first stop fixed with respect to the seat back, connecting with the seat back a second pivot pin along a second pivotal axis, pivotally mounting with respect to the seat cushion a slip block along a third pivot pin, the third pivot pin being fixed with respect to the seat back, angularly biasing the slip block against a second angular stop generally fixed with respect to the seat back, and pivotally connecting on the second pivot pin a pendulum, contacting the slip block with the pendulum in a direction pivoting the slip block away from the second angular stop when the seat back is pivotally moved forward under low acceleration whereby allowing the seat back to further pivot forward, and exposing the pendulum to a rearward acceleration of a predetermined value and pivoting the pendulum on the second pivot pin to contact the slip block to pivot in an angular direction towards the second angular stop whereby limiting the forward pivotal travel of the seat back when the seat back has pivotal movement forward under a high angular acceleration.

Other objects, desires and advantages of the present invention will become more apparent to those skilled in the art as the nature of the invention is better understood from the accompanying drawings and a detailed description.

DETAILED DESCRIPTION OF THE DRAWINGS

Figures 1, 2:
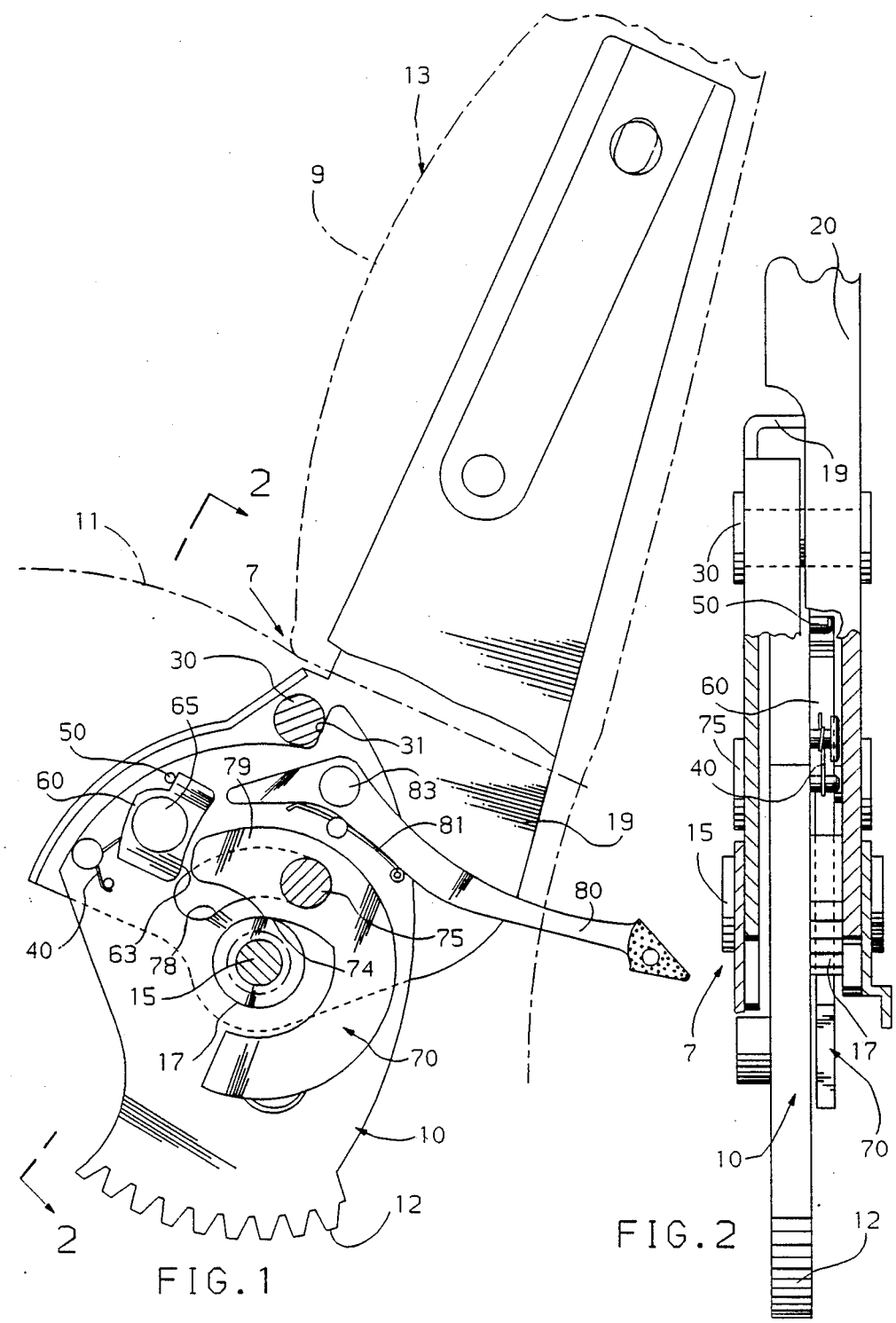
FIG. 1 is a sectional view mainly in side elevation of a preferred embodiment vehicle seat inertia latch according to the present invention.
FIG. 2 is a view taken along line 2—2 of FIG. 1.

Referring to FIGS. 1 and 2, the inertial latch 7 of the present invention is shown in the environment of a vehicle recliner seat 13. Seat back 9 is connected with plate 19. Plate 19 is pivotally mounted with respect to a seat cushion 11 via first pin 15 which defines a first pivotal axis. Connected with plate 19 is a stop pin 30. Stop pin 30 abuts against step 31 of a gear plate 10 to define the rearward angle of inclination of the plate 19 (rest position). A powered gear (not shown) meshes with gear teeth 12 of gear plate 10 to adjust the reclining inclination of seat back 9. Seat back 9 is allowed free pivotal movement forward on pin 15 to allow access to the rear seating of the vehicle as will be later explained.

Pivotally mounted with respect to the vehicle via a pin 65 coaxial with a third pivotal axis is a slip block 60 pin 65 is connected to the plate 10. The slip block 60 is angularly biased by a spring 40 in a direction against a stop 50. Stop 50 is generally fixed with respect to the axis of the pin 15 and is connected to the vehicle via the plate 10.

Connected with plate 19 and projecting horizontally therefrom is a second pin 75 which is offset from the first pivotal axis. Pivotally connected on second pin 75 along a coaxial second pivotal axis is an actuator pendulum 70. The axis of pin 75 is between the elevation of the first (lowest) and third (highest) pivotal axes. The pendulum 70 has a center of gravity (CG) 72. A vertical plane 93 intersecting the center of CG 72 is laterally between the first and second pivotal axes when the seat back 9 is in a rest position. A line intersecting the second pivotal axis with the CG 72 is approximately 7 degrees from vertical due to the contact of portion 74 with the enlarged diameter stop 17 of first pin 15. The above configuration improves the sensitivity of the inertia latch 7.

To facilitate the forward pivotal movement of the seat back a slot 78 is provided in gear plate 10 for passage of second pin 75. Third pin 65, slip block 60 and spring 40 are connected on gear plate 10. Therefore operation of the recliner function of seat 9 can occur independent of the operation of inertial lock 7.

Figure 3:
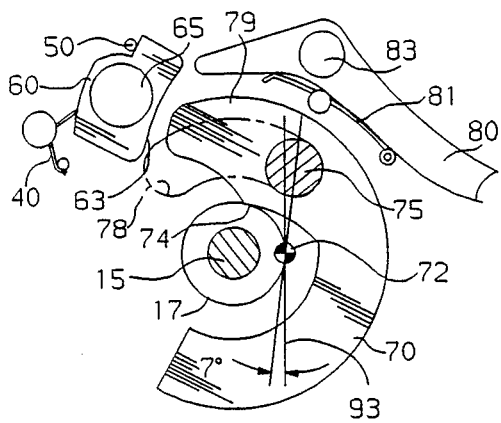
FIGS. 3, 4, and 5 illustrate operation of the vehicle seat latch when the vehicle seat back is pivoted forward under periods of low acceleration.
Figure 4:
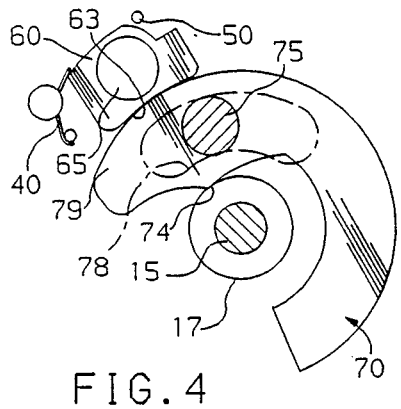
Figure 5:
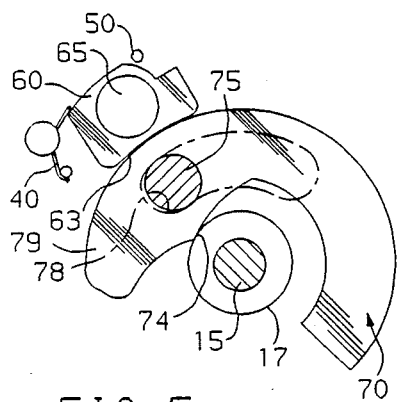

Referring to FIGS. 3-5, the seat fold operation is the action by which the seat back 9 is rotated forward, allowing access to the rear of the vehicle. The above will occur at a low acceleration since it is a manual operation. When the above happens, the plate 19 carries the pendulum 70 which strikes the slip block 60 below the third pivotal axis. The slip block 60 then rotates (away from stop 50) so that the pendulum 70 can slide freely below it. In turn, the seat back 9 is also allowed to move. FIGS. 3, 4 and 5 illustrate the above motion at regular angles of rotation. When the seat back 9 is returned to its original position, the spring 40 returns the slip block 60 to its original orientation.

When the vehicle undergoes a high deceleration (acceleration), a couple will be formed by the deceleration of pin 15 causing a force on the upper portion 79 of the pendulum to the right and the kinetic energy in the pendulum causing a force to the left CG 72. The resultant change of force causes the pendulum 70 to rotate counterclockwise (FIG. 6 solid line, phantom position illustrates unlatched position). Typically the inertial lock is required to engage at a minimum of 0.5 g. Thus, the pendulum 70 must lock when the CG 72 is at an angle of 26.6 degrees from vertical. (The angle of the resultant force due to gravity and the 0.5 g deceleration is 26.6 degrees.) After the pendulum 70 rotates, it will strike the slip block 60 above the third pivotal axis. The resulting moment, however, is opposed by the stop 50. The pendulum 70 cannot move past it and therefore the seat back 9 (via plate 19) is restrained.

Theoretical studies have shown that the pendulum 70 will always respond faster than the seat back 9. In addition, the sensitivity of inventive seat inertial latch 7 is greater than most others in that it only needs about 19 degrees of travel to lock up; prior inertial latches required a travel of approximately 27 degrees before locking up. As illustrated, inertial latch 7 will actually engage after only 17 degrees of travel.

Figure 7:
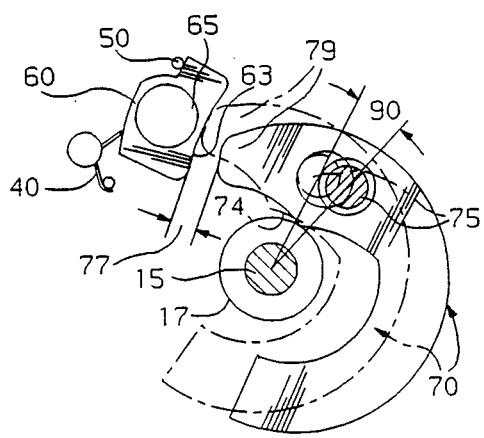
FIG. 7 illustrates the free play inherent in a operation of the latch.

Even in the locked position, the seat back 9 is permitted to rotate over the small angular range between full contact and the inertial locking position of pendulum 70 with slip block 60 (FIG. 7). The above-noted free play 90 (Note the angular free play of the pendulum 70 is exaggerated for visual purposes) is due to the gap 77 between the pendulum 70 and the slip block 60 before contact, and, to a small degree, the loose fit of the pendulum 70 on the second pin 75. The gap 77 is required to insure that the pendulum 70 rotates to the lock position before hitting the slip block 60. The inertial latch 7 will have about 3.2 degrees of free play per millimeter of gap space. The present inertial latch 7 has demonstrated reliability with a gap of less than 1.4 mm with 4.4 degrees of free play. A reduced 1.0 mm gap would work as well. Prior production inertial latches have required at least 5 degrees of free play.

Figure 6:
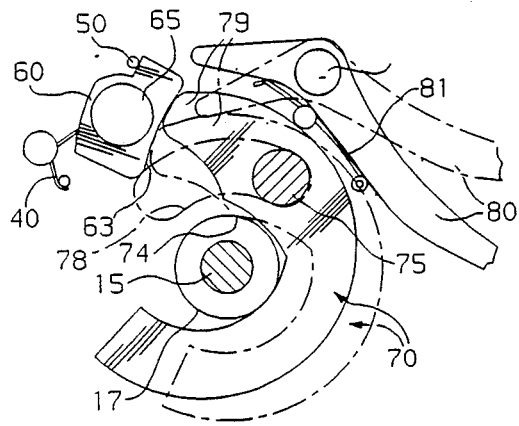
FIG. 6 illustrates operation of the vehicle seat latch when the seat back undergoes a high angular acceleration (high vehicle deceleration) and the release of the latch from a locked position.

Because the pendulum 70 actuator responds to a change in the direction of force, it is possible to engage the lock while the vehicle is facing down a steep hill. In such cases a release mechanism is required. Prior inertial latches employed a hooked locking element in cooperation with an actuator. To release the prior latches required rotating the pendulum with a lever while at the same time pulling the seat back rearward. The above was mandated by the geometry of the hook which cooperated with the actuator Pivotally connected with gear plate 10 by pin 83 is a release lever 80. The release lever 80 is biased to an upper position by a spring 81. With the inertial latch 7 of the present invention the releasing motion (FIG. 6) is not opposed by anything but friction. The cam surface 63 of the slip block 60 allows the pendulum 70 to be knocked out of the locked position by release lever 80 without pulling the seat back 9 rearward (FIG. 6).

Unlike many prior inertial latches the present inventive inertial latch 7 does not have any components high in the seat back 9. Therefore, when the seat back 9 is dumped forward there are not any components obstructing entry to the rear seat of the vehicle.

While seat back 9 designs vary with car lines, the pivot areas are usually similar. Thus, the present inertial latch 7 can be adapted to many seat backs with minimal modification from car line to car line.

The present invention provides a method of pivotally connecting a seat back 9 with a seat cushion 11 along a first pivotal axis 15 allowing the seat back 9 to have free pivotal movement forward under low angular accelerations and to restrain pivotal movement of the seat back 9 forward under high angular accelerations, the method including the following steps:

1. Pivotally connecting the seat back 9 with the seat cushion 11 along the first pivotal axis 15;
2. Connecting with the seat cushion 11 a first stop 17 fixed with respect to the seat back 9;
3. Connecting with the seat back 9 a second pivot pin 75 along a second pivotal axis;
4. Pivotally mounting with respect to the seat cushion 11 a slip block 60 along a third pivot pin 65 the third pivot pin 65 being fixed with respect to the seat back 9;
5. Angularly biasing 40 the slip block 60 against a second angular stop 50 generally fixed with respect to the seat back 9;
6. Pivotally connecting on the second pivot pin 75 a pendulum 70;
7. Contacting the slip block 60 with the pendulum 70 in a direction pivoting the slip block 60 away from the second angular stop 50 when the seat back 9 is pivotally moved forward under low acceleration whereby allowing the seat back 9 to further pivot forward; and
8. Exposing the pendulum 70 to a rearward acceleration of a predetermined value and pivoting the pendulum 70 on the second pivot pin 75 to contact the slip block 60 to pivot in an angular direction towards the second angular stop 50 whereby limiting the forward pivotal travel of the seat back 9 when the seat back 9 has pivotal movement forward under a high angular acceleration.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A method of pivotally connecting a seat back with a seat cushion along a first pivotal axis allowing the seat back to have free pivotal movement forward under low angular accelerations and to restrain pivotal movement of the seat back forward under high angular accelerations, said method in combination comprising:

pivotally connecting said seat back with said seat cushion along said first pivotal axis;

connecting with said seat cushion a first stop fixed with respect to said seat back;

connecting with said seat back a second pivot pin along a second pivotal axis;

pivotally mounting with respect to said seat cushion a slip block along a third pivot pin said third pivot pin being fixed with respect to said seat back;

angularly biasing said slip block against a second angular stop generally fixed with respect to said seat back; and pivotally connecting on said second pivot pin a pendulum;

contacting said slip block with said pendulum in a direction pivoting said slip block away from said second angular stop when said seat back is pivotally moved forward under low acceleration whereby allowing said seat back to further pivot forward; and exposing said pendulum to a rearward acceleration of a predetermined value and pivoting said pendulum on said second pivot pin to contact said slip block to pivot in an angular direction towards said second angular stop whereby limiting the forward pivotal travel of said seat back when said seat back has pivotal movement forward under a high angular acceleration.

* * * * *